March 17, 1953      J. J. JAEGER      2,632,035

DEMAGNETIZING CONTROL SYSTEM

Filed May 6, 1950      2 SHEETS—SHEET 1

INVENTOR
J. J. Jaeger
BY
Joseph H. Schofield
ATTORNEY

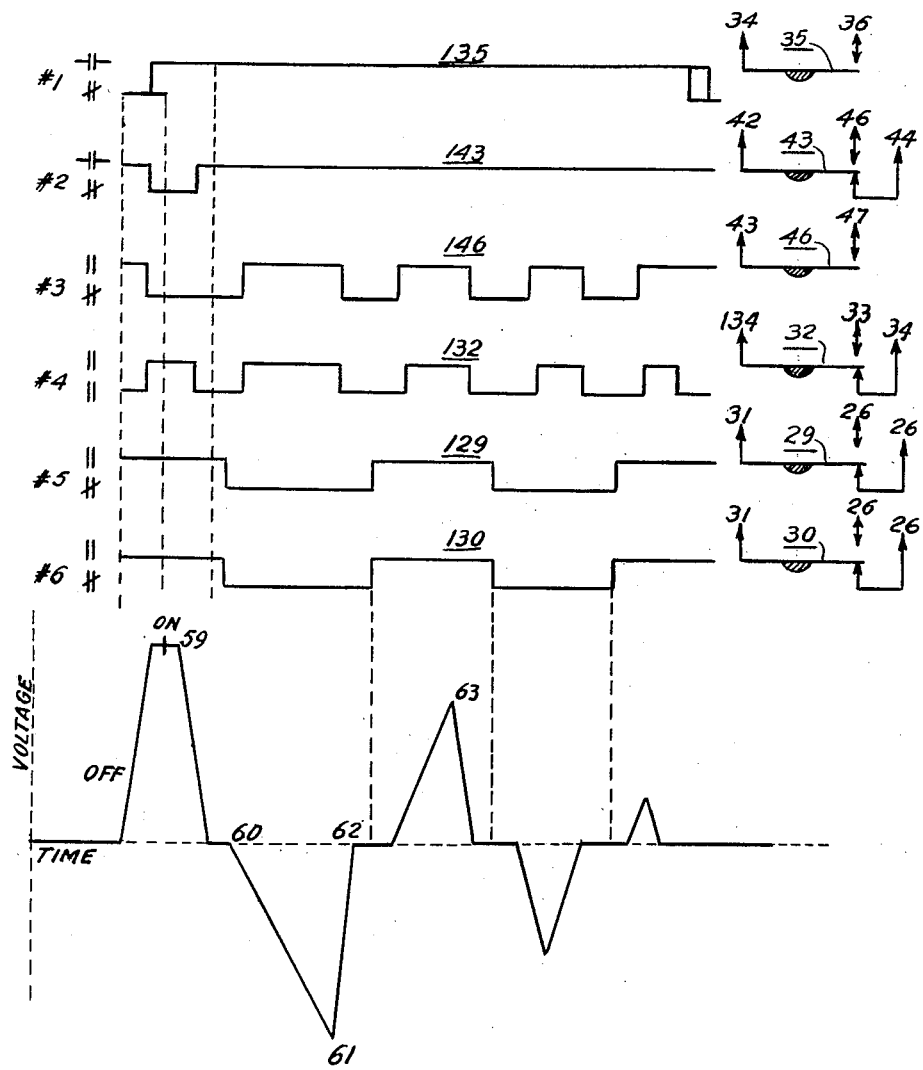

Patented Mar. 17, 1953

2,632,035

UNITED STATES PATENT OFFICE 2,632,035

DEMAGNETIZING CONTROL SYSTEM

Jacob J. Jaeger, Canton Center, Conn., assignor to Niles-Bement-Pond Company, West Hartford, Conn., a corporation of New Jersey Application May 6, 1950, Serial No. 160,425

8 Claims. (Cl. 175—181)

The invention relates to a demagnetizing control system adapted to remove residual magnetism from electromagnets, such as magnetic chucks of machine tools and work pieces on said chucks after the magnetizing current has been interrupted.

It is an object of the present invention to provide a device including a series of time-controlled, cam-operated switches which will automatically effect a gradual demagnetization of an electromagnet, such as a magnetic work holding chuck, by applying a series of D. C. voltage impulses to the magnet winding alternately in opposite directions, each reversal impulse being of decreased strength until a value is reached where practically no residual magnetism will remain in the magnet.

It is a further object of the present invention to provide in such device a transformer with a variable output voltage and driving means adapted to change the position of the voltage regulating mechanism of said transformer under the control of one of the aforementioned cam-controlled switches associated with said driving means.

It is a still further object of the present invention to provide in such device an auto-transformer, the variable voltage regulating mechanism of which is driven by a reversible motor, and limit switches positioned and actuated at the ends of the path of said regulating mechanism adapted to interrupt the current supply to and thereby stop said reversible motor each time the highest and lowest regulating positions are obtained, one of the aforementioned cam-operated switches controlling the driving direction of said reversible motor.

Another and important object of this invention is to provide two of the cam-operated switches as current-direction reversing switches in the circuit of the electromagnet, such as the magnetic chuck.

It is another object of the invention to provide a motor, simultaneously driving all of the cams of said cam-operated switches at a substantially constant speed, there being a limit switch in the circuit of said motor positioned at the lower regulating end of the regulating mechanism of the reversible motor, the limit switch being normally open and adapted to be closed when the movable member of the regulating mechanism reaches its lower regulating limit, whereby the cam-driving motor is started in operation when the movable member of the regulating mechanism is at its lower regulating limit.

And finally it is an object of the invention to provide circuits for demagnetizing an electromagnet, the reversing of the switch for reversing the current to the magnet taking place when the voltage at the reversing switch is zero.

Other and further objects and advantages of the present invention will be more fully understood by reference to the following description and the accompanying drawings, illustrating a preferred embodiment thereof, wherein:

Figure 3 is a diagrammatic developed view of the developed cams with the respectively cooperating switches indicated at the right side thereof and the curve of the demagnetizing current at the consecutive angular positions of said cams, illustrated thereunder.

Figure 1:
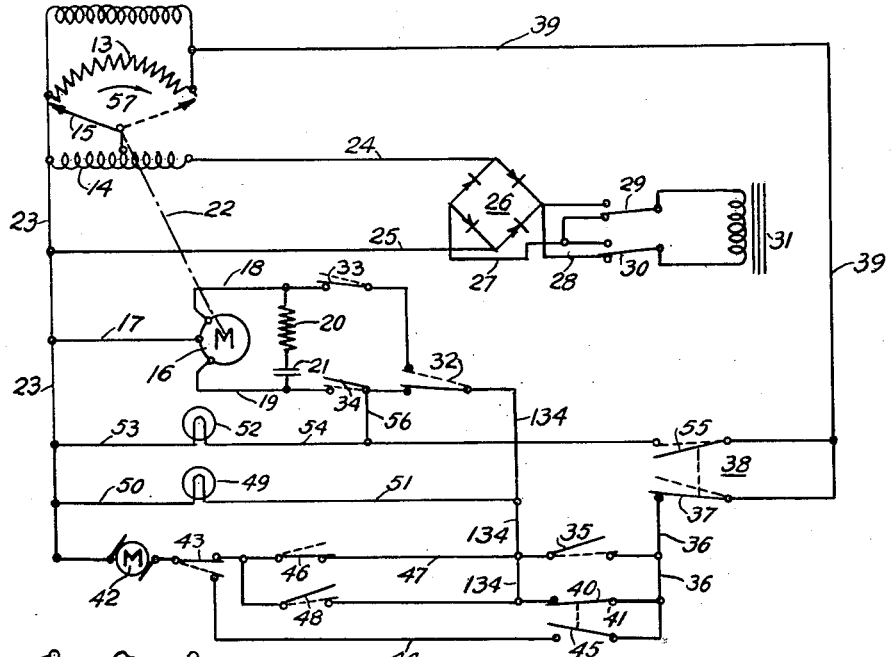
Figure 1 shows a circuit diagram of a device, according to the invention, with manual switches in position for magnetizing an electromagnet.

In Figure 1 of the drawings, the primary side of an input transformer 10 is connected to the terminals 11 and 12 of an A. C. current source, the secondary side of said transformer being connected to a potentiometer or variable transformer 13 which is associated with an auto-transformer 14. A rotatable arm 15 of said potentiometer or variable transformer 13 is adapted to slide over contacts connected to taps in the winding of the potentiometer or variable transformer 13. The rotatable arm 15 is turned by a reversible motor 16 of the synchronous induction type having three leads 17, 18 and 19, of which lead 17 is the common lead, while either of the leads 18 and 19 interconnected by a resistor 20 and a condenser 21 providing a phase-splitting circuit, is used to supply current to said motor, whereby the latter rotates in the one or other direction, respectively. A reduction gear, not shown in the drawing, is provided between the shaft of the reversible motor 16 and the rotating shaft of the arm 15. For example, the reversible motor 16 may make 72 R. P. M. in either direction and the reduction ratio of the gear may be 3 to 1, or any other convenient ratio. The driving connection between the reversible motor 16 and the arm 15 is indicated in the drawing by dash-dot line 22. The arm 15 travels from its lowest voltage position at left through an angle of about 140° to reach the full voltage position at right. Actually, said angle may be much larger, for example, 300°.

A conductor 23 is connected to the left terminals of the secondary of the input transformer 10 of the variable transformer 13 and of the auto-transformer 14. Input leads 24 and 25 of a full-wave rectifier 26, preferably of the copper oxide or other plate type, are connected to the right terminal of the auto-transformer 14 and to the conductor 23, respectively. Output leads 27 and 28 of said rectifier 26 are connected to one of the two contacts on one side of each of two cam-controlled switches 29 and 30 in such a manner that the polarity at the output sides of said switches is reversed when the switches are actuated. The single contacts at the output sides of said switches 29 and 30 are connected to the winding of an electromagnet chuck 31 or the like, so that said winding is fed by a D. C. current of changing direction, when the switches 29 and 30 are alternately operated. While these switches are in one or other of their positions, the voltage of the A. C. current supply to the rectifier 26, and thereby the D. C. output voltage of the latter fed to the electromagnet 31 through the cam-operated switches 29 and 30, is varied from minimum to maximum values and vice versa by turning the contact arm 15 of the variable transformer 13 under control of the reversible motor 16, as will be explained below.

The common lead 17 of the reversible motor 16 is directly connected to the conductor 23, while each of the opposite leads 18 and 19 of said motor is connected to one of the two contacts on one side of a cam-operated switch 32 through a high limit switch 33 and a low limit switch 34, respectively. These limit switches are normally held in closed positions, for example, under spring action. The high limit switch 33 is actually located at the high voltage or right end of the regulating path of the arm 15 of the transformer 13 and the contacts of said switch are opened by said arm, when it arrives at said end. The low limit switch 34 is actually associated with the low or left end of the regulating path of the arm 15 and the contacts of the latter switch are also opened by said arm, when it arrives at the low voltage or left end. When the arm 15 leaves one or the other of its ends, the contacts of the respective limit switches are automatically closed under action of their springs. For the sake of clarity, the actual location of the two limit switches 33 and 34, as described above, is not illustrated in Figure 1. The single contact opposite the two contacts of the switch 32 can be connected to the right side of the secondary of the input transformer 10 and to the right side of the winding of the transformer 13, through conductor 134, cam-operated switch 35, conductor 36, lower arm 37 of a manual double pole switch 38 and conductor 39. The cam-operated switch 35 can be bridged by an upper arm 40 of a manual double pole switch 41.

A motor 42 through an internal reduction gearing, not shown in the drawing, is adapted to drive a cam shaft at a relatively low speed of, for example, one half R. P. M. Six cams 129, 130, 132, 135, 143 and 146 are mounted on and rotated by this cam shaft, the developed cams being diagrammatically shown in Figure 3 of the drawing associated with their respective switches. According to Figure 1, the motor 42 is directly connected to the conductor 23 and to conductor 36 through cam-operated, two-contact switch 43 either by conductor 44, the lower arm 45 of the manual double pole switch 41, or by a cam-operated switch 46, the conductor 47 and cam-operated switch 35. The conductor 36 is connectable to the right side of the secondary of the input transformer 10 and the right side of the transformer 13 by the lower arm 37 of the manual double pole switch 38 and conductor 39.

A low limit switch 48 located at the low voltage or left side of the transformer 13 can bridge the contacts of the cam-operated switch 46, the contacts of the low limit switch 48 being normally held open, for example, by spring action, and being adapted to be closed by the arm 15 of the transformer 13 when the arm 15 reaches the low voltage or left end position of its path. When the arm 15 leaves this position, the contacts of the low limit switch 48 are opened under action of its spring.

A first signal light 49 is connected across the conductors 23 and 134 by the conductors 50 and 51, respectively. A second signal light 52 can be connected to the conductor 23 through a conductor 53 and to the conductor 39 by a conductor 54 and an upper arm 55 of the manual double pole switch 38. There is also provided a conductor 56 between the conductor 54 and the wire connecting the lower limit switch 34 and the one of the two contacts on one side of the cam-operated switch 32.

The two manual switches 38 and 41 of double pole type are constructed in such a manner that one arm of each of said switches is in closed position, while the other is in open position and vice versa.

With reference to Figure 3, the different cams operate the following switches:

| Cam | Cam-operated switch |
| --- | --- |
| 135 | 35 |
| 143 | 43 |
| 146 | 46 |
| 132 | 32 |
| 129 | 29 |
| 130 | 30 |

As clearly shown in Figure 3, the conformation of these cams differs from one another in accordance with the required actuation of the individual switches. While each of the cams 135 and 143 has only one notch, a plurality of notches is provided in the other cams, the lengths and location of said notches being different over the length of each cam. These notches and the operation of the cam-operated switches by said notches will be explained below together with the operation of the control system. The cooperation of the respective cams and switches will be understood with reference to the diagrammatic representation of the open and closed condition of these switches at the left side of their cams.

The operation of the device according to Figures 1 and 3 is as follows:

When the electromagnet 31 is to be magnetized, the manual "on-off" switch 41 is moved from its "off" position to the "on" position, while the manual "power-residual magnetism" switch 38 is moved to the "power" position. The switches 41 and 38 are shown in these positions in Figure 1. A. C. current will thus be supplied from the secondary of the input transformer 10 to the cam-driving motor 42 through the conductor 23, the conductor 39, the lower arm 37 of the manual switch 38, conductor 36, the upper arm 40 of the manual switch 41, the conductor 134, the cam-operated switch 46 held in closed position by its cam 146 in the beginning of this operation, the cam-operated switch 43 held in the position shown in Figure 1 by its cam 143 in the beginning of this operation (see Figure 3). The motor 42 will start to run and slowly rotate all of the cams.

The reversible motor 16 turning the arm 15 of the variable transformer 13 does not start to run immediately, because it is not supplied with A. C. current in the beginning of this operation, as the motor circuit is interrupted by the open contacts of the lower limit switch 34 held in this position by said arm 15 which is at the lower regulating end of its path, as shown in Figure 1.

When the cams have turned through an angle of about 10°, the following switch operations take place: the cams 135 and 132 actuate their switches 35 and 32, respectively. The new positions of these switches are indicated by dotted lines in Figure 1. While the operation of the switch 35 merely closes a signal light circuit through the lamp 49 by conductors 34, 51, 50 and 23, the motor 16 is put in operation by the actuation of the switch 32, since the motor circuit is now closed as follows: This circuit can be traced starting from the left side of the input transformer 10 through the conductor 23, the lead 17, the motor 16, the lead 18, the closed high limit switch 33, the cam-operated switch 32 (in dotted position), the conductor 134, the upper arm 40 of the manual switch 41, the conductor 36, the lower arm 37 of the manual switch 38, the conductor 39 to the right side of the secondary above transformer 10. As the motor 16 is fed through the lead 18 of the phase-splitting system, it is turning the arm 15 of the transformer 13 in the direction of the arrow 57, i. e., from low voltage to high voltage, whereby the voltage at the terminals of the auto-transformer 14 is increased from a minimum to a maximum value during this turning step taking place rapidly with respect to the advance of the cams driven by the motor 42. The high end position of the arm 15 is indicated with a dotted line. Thus, the rectifier 26 connected to the terminals of the auto-transformer 14 through the conductors 24, 25 and 23 is fed with an A. C. current of a voltage rapidly increasing as described above. The D. C. output current of the rectifier increasing correspondingly is supplied to the terminals of the electromagnet 31 through the conductors 27 and 28 and the cam-operated switches 29 and 30 closed in one position which will not be changed during this step, since the formation of the two cams 129 and 130 is unchanged over a considerable length, as shown in Figure 3. The D. C. current-time curve below the developed cams in this figure indicates how the current in the winding of the electromagnet 31 rapidly increases, until it reaches its maximum value, when the arm 15 of the transformer 13 arrives at the right or high voltage regulating end of its path and stops the motor 16 by separating the contacts of the high voltage limit switch 33. In the meantime, the motor 42 has turned the cams through an angle of about 30° and the cam-operated switches 43, 46 and 32 (see Figure 3) have been actuated, i. e., are in the positions shown in dotted lines in Figure 1. The current supply to motor 42 is thus interrupted and this motor therefore stopped. The maximum magnetizing D. C. current is now permanently acting on the electromagnet 31, which can be used in the usual manner to hold work pieces or the like. With the switches in this position, signal light 49 indicates that the power is on the electromagnet 31.

Figure 2:
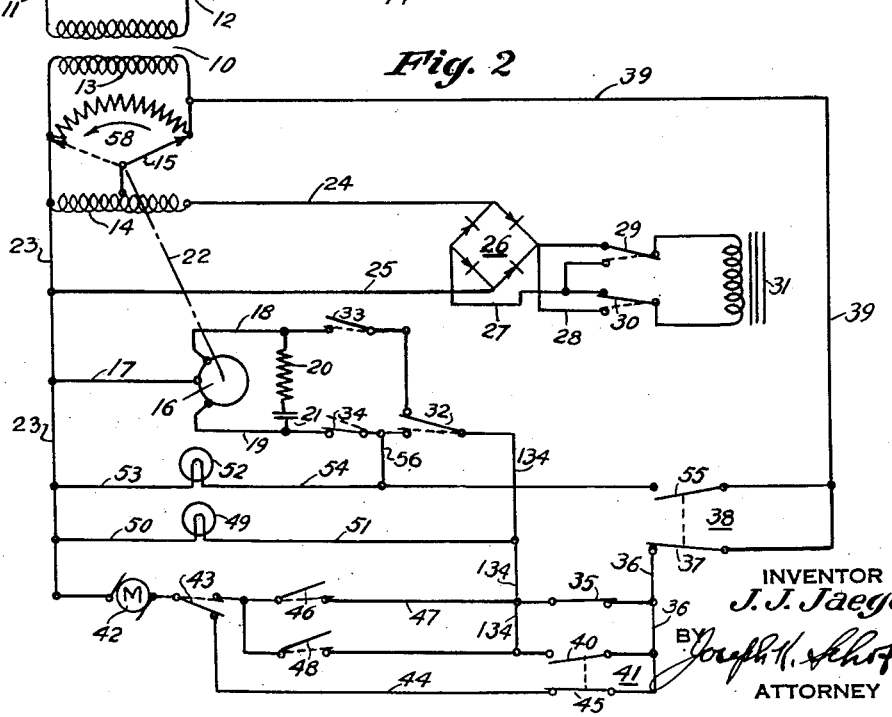
Figure 2 is the same circuit diagram with the manual switches in position for demagnetizing an electromagnet in accordance with this invention.

Figure 2 shows the same circuit diagram as Figure 1 with the exception that the manual switch 41 is moved to the position for demagnetizing the electromagnet 31 in accordance with the present control, while the manual switch 38 is left in the same position as before. The cam-operated switches and the limit switches are shown in their position at the start of this demagnetizing operation with full lines. The demagnetizing cycles take place as follows.

As a result of the closing of the contacts of the lower arm 45 of the manual switch 41, a circuit through the cam-driving motor 42 is completed. This circuit can be traced from the left side of the secondary of input transformer 10 through conductor 23, motor 42, cam-operated switch 43, conductor 44, lower arm 45 of the manual switch 41, conductor 36, lower arm 37 of the manual switch 38, conductor 39 to the right side of the secondary of the input transformer 10. The motor 42 starts to run and rotates the cams, whereby the switches 43 and 32 are operated, as can be easily understood by an inspection of Figure 3. The switch 43 is moved by its cam 143 during this switching operation to the position shown by a dotted line in Figure 2. The circuit through motor 42 is now interrupted and the motor stops. Due to the operation of switch 32, which has taken place before motor 42 has stopped, the switch was moved from the position shown by a full line in Figure 2 to the position indicated by a dotted line, whereby the circuit through the reversible motor 16 is closed in such a manner that this motor moves the arm 15 of the variable transformer 13 from its high voltage position shown with a full line, to its low position, indicated by a dotted line, in the direction of the arrow 58. The circuit through the reversible motor 16 can be traced from the left side of the secondary of the input transformer 10 through conductor 23, lead 17, motor 16, lead 19, the closed lower limit switch 34, cam-operated switch 32 (in dotted position), conductor 134, cam-operated switch 35, conductor 36, lower arm 37 of the manual switch 38, conductor 39 to the right side of the secondary of the input transformer 10. As a result of the moving of arm 15 from high to low voltage in the direction of the arrow 58 at a relatively high speed, the D. C. current supplied to the electromagnet 31 is rapidly decreased from its maximum value at 59 in Figure 3 to zero at 60.

When the arm 15 arrives at the low voltage or left end of its path, it actuates the two limit switches 34 and 48 located at said end, as mentioned in the foregoing. The normally closed limit switch 34 is opened interrupting the circuit of the motor 16 and stopping the latter, while the normally open limit switch 48 is closed; whereby the circuit of the previously stopped motor 42 is completed and this motor starts to run again. The circuit through the motor 42 can be traced from the left side of the secondary of the input transformer 10 through conductor 23, motor 42, cam-operated switch 43 (in dotted position), low voltage limit switch 48 (in dotted position), conductor 134, cam-operated switch 35, conductor 36, lower arm 37 of the manual switch 38, conductor 39 to the right side of the secondary of the input transformer 10.

As the cams are rotated by the motor 42, the following operations take place: the cam 146 operates, i. e., closes, the switch 46 (see dotted position in Figure 2) and cams 129 and 130 actuate the switches 29 and 30, respectively, whereby the direction of the D. C. current supplied from the the rectifier 26 to the winding of the electromagnet 31 is reversed. The new position of the switches 29 and 30 is indicated by dotted lines.

Thereafter, the reversible motor 16 previously stopped is put in operation by the action of the cam 132 returning switch 32 to its original position, shown by a full line in Figure 2. The running direction of the motor 16 is reversed by this operation of the switch 32, since the motor circuit is closed by lead 18 and high voltage limit switch 33 (in dotted position). The arm 15 of the variable transformer 13 is now turned from low voltage position to high voltage position in a direction opposite with respect to the direction of the arrow 58 and the D. C. voltage supplied to the electromagnet 31 is rapidly increased. As the direction of the D. C. current was reversed by the actuation of the switches 29 and 30, a negative current curve having its peak at 61 is obtained, as shown in Figure 3. Before the arm 15 arrives at its high voltage or right end of its regulating path, the running direction of the motor 16 turning said arm is reversed by the actuation of switch 32 which is moved by cam 132 from the position shown in a full line to the position indicated in a dotted line, thus interrupting the motor circuit through lead 18 and high voltage limit switch 33 and closing the circuit by lead 19 and low voltage limit switch 34. As the motor circuit through lead 18 was interrupted, before arm 15 reached its high or right end position, the maximum value of the demagnetizing current pulse 61 is somewhat lower than the magnetizing current 59 when the power was on the electromagnet 31. Actually, the projection on cam 132 causing this actuation of switch 32 at the projection end is so short that motor 16 was reversed before arm 15 had reached its end position, so that the demagnetizing current phase with a slightly lower maximum value was obtained.

Cam 146 now operates the closed switch 46, i. e., this switch is opened and thereby the circuit through cam-driving motor 42 is interrupted and the motor is stopped.

The motor 16 was energized by the previous moving of the cam-operated switch 32 to the dotted position in such a manner that the motor turns the arm 15 of the variable transformer 13 in the direction of the arrow 58, whereby the D. C. voltage supplied to the electromagnet 31 is gradually decreased to zero. The zero point of the current curve of this pulse is specified by the numeral 62 in Figure 3. When arm 15 arrives at the low voltage or left end of its path, the two low voltage limit switches 34 and 48 are operated, i. e., the closed low voltage limit switch 34 is opened and the circuit through motor 16 is interrupted and the motor stopped, while the open low voltage limit switch 48 is closed, whereby the circuit through cam-driving motor 42 is closed and this motor restarted for a new pulse. The cams are rotated by this motor and the following operations take place: the two current-direction reversing switches 29 and 30 are actuated by their cams 129 and 130, respectively. Thereafter, switches 46 and 32 are operated by the cams 146 and 132, respectively, in the same manner as during the previous demagnetizing pulse. However, the new current pulse is in the opposite direction in view of the reversing of the current by the actuation of the switches 29 and 30. Furthermore, the maximum voltage value at 63 in Figure 3 of this new current pulse is lower than that of the previous pulses, since the projections on the cams 146 and 132 actuating the switches 46 and 32, respectively, during this pulse are shorter than the projections acting on these switches during the previous pulse. The demagnetizing operation continues with further pulses of gradually decreasing peak values alternately in opposite direction, the pulses being obtained principally in the same manner as described in the foregoing for the first demagnetizing pulse. The projection on the cams 146, 132, 129 and 130 are gradually decreasing in length, as shown in Figure 3.

While only one cycle of four pulses can be obtained with the set of cams shown in Figure 3, this cycle is repeated three times. This is made possible by providing three sets of these cams around the cam shaft, each of these sets having an arcuate length of 120°, so that the three sets together have an arcuate length of 360°. When the cam shaft makes a full revolution, three complete cycles will be completed. At the end of this demagnetizing operation, practically no residual magnetism will be left in the electromagnet 31 and a work piece supported thereon can be removed without difficulties. The demagnetizing step is finished, when the cam 135 actuates the switch 35 at the end of said cam, i. e., the switch 35 is opened and the circuit through motor 42 interrupted and said motor stopped.

During the demagnetizing step the circuit through the signal light 49 was closed, so that said lamp indicated this operation. This lamp circuit can be traced from the left side of the secondary of the input transformer 10 through conductors 23 and 50, lamp 49, conductors 51 and 134, cam-operated switch 35, conductor 36, lower arm 37 of the manual switch 38, conductor 39 to the right side of the secondary of the input transformer 10. When the switch 35 opened at the end of the demagnetizing step, the lamp circuit was likewise interrupted, extinguishing the light.

The new device permits demagnetizing electromagnet 31 without using the gradually decreasing pulse method described in the foregoing. For this operation, the manual switch 38 is moved from the position shown with full lines in Figure 1 to the position indicated with dotted lines, when the power is on the electromagnet. The switch 41 remains in the same position as shown in Figure 1. By this change in the position of said switch 38, its lower arm 37 interrupts the circuit through the motor 42, while its upper arm 55 completes a circuit through the signal light 52. This circuit can be traced from the left side of the secondary of the input transformer 10, through conductors 23 and 53, lamp 52, conductor 54, upper arm 55 of the manual switch 38, conductor 39 to the right side of the secondary of the input transformer 10. The lamp 52 lights up indicating the demagnetizing step without using the gradually decreasing pulse method.

Simultaneously a circuit through the motor 16 is closed, which can be traced as follows: from the left side of the secondary of the input transformer 10 through conductor 23, lead 17, motor 16, lead 19, closed low voltage limit switch 34, conductor 56, conductor 54, upper arm 55 of the manual switch 38, conductor 39 to the right side of the secondary of the input transformer 10. The motor 16 starts to run and returns the arm 15 of the variable transformer 13 from its high voltage or right position, in which it remained while the power was on the electromagnet 31, to its low voltage or left position, whereby the magnetizing current is decreased from its full value to zero. When the arm 15 arrives at the low voltage end of its path, the low voltage limit switch is opened, the circuit through the motor 16 interrupted and this motor stopped. The demagnetizing operation is thus completed, i. e., some residual magnetism, however, will be left in the electromagnet 31 in this case.

The two original lights indicate to the operator the proper operation of the device, i. e., only one of the lamps 49 or 52 lights up at any particular time. If the lights 49 and 52 should light up together, the operation is faulty or incomplete.

With the system according to this invention, a complete demagnetizing operation is automatically completed in a few seconds in an efficient manner. The operator of a machine tool having chucks controlled by the present system has to operate only a single manual switch, i. e., switch 41, for applying power to said chuck and demagnetizing it gradually according to the invention. The other manual switch 38 is used, if a simple or conventional demagnetizing step, rather than the present inventive operation, is to be carried out.

Although this invention has been described as embodied in a single concrete form to illustrate the principle of the invention and the invention has been explained together with the best manner in which it is now contemplated applying the principle, it will be understood that the elements and combinations shown and described are illustrative only and that the invention is not limited thereto. Alterations and modifications will readily suggest themselves to persons skilled in the art without departing from the spirit of the present invention or from the scope of the annexed claims. In particular, the size and number of the projections and depressions of the cams operating the switches may be changed and the speeds and/or reduction ratios of the gears of the two motors controlling the demagnetizing steps varied.

I claim as my invention:

1. An apparatus for demagnetizing an electromagnet having an energizing coil, comprising in combination, a current source, circuit means between the latter and said coil to deliver demagnetizing currents to said coil, current reversing means in said circuit, means in said circuit to regulate the value of the demagnetizing currents from a low current value to a high value and vice versa, separate mechanisms to operate said current reversing means and said current regulating means, said mechanism to operate said current reversing means comprising a plurality of sequentially operable controlled devices, of which some operate said current reversing means, switch means operatively connected to others of said sequentially operable controlled devices, each of said mechanisms having an electric actuating means, separate control circuits including current sources between said switch means and said electric actuating means, means to stop said operating mechanism of said current regulating means and to start said operating mechanism of said sequentially operable controlled devices, when said current regulating means is at its low current value position, said sequentially operable controlled devices being timed in such a manner that intermittent surges of demagnetizing current of consecutively opposite polarity and of a maximum value decreasing with each successive surge are supplied to said coil and that the current values of said surges are gradually built up to a maximum and gradually decreased to zero by said current regulating means during each surge, whereby said operating mechanism of said current regulating means is restarted and said operating mechanism of said sequentially operable controlled devices stopped under control of the latter at the proper times.

2. An apparatus according to claim 1, wherein a rectifier fed by an alternating current source is connected to said coil and wherein a variable transformer is provided as current regulating means between input of said rectifier and said alternating current source.

3. An apparatus according to claim 1, wherein a reversible electric motor serves as electric actuating means of said mechanism operating said current regulating means and wherein said switch means controls the direction of movement of said reversible motor.

4. A control system including a plurality of sequentially operable controlled devices, comprising in combination with a source of electric power, a main circuit including said source of electric power, means to regulate the value of the current in said main circuit from a low current value to a high current value and vice versa, an electrically operable control mechanism actuating said current regulating means, a plurality of switch means respectively associated with and actuated by said sequentially operable controlled devices, a motor operating said devices, control circuits including current sources and said electrically operable control mechanism and said motor, respectively, some of said switch means being inserted in said main circuit as current direction reversing means, others of said switch means being connected to said control circuits, means to stop said electrically operable control mechanism and to start said motor when said regulating means arrives at its low current value regulating position, said sequentially operable controlled devices being timed in such a manner that intermittent current impulses of consecutively opposite polarity and of a maximum value decreasing with each successive impulse are produced in said main circuit and that the value of each impulse is gradually built up and decreased to zero during its duration of said regulating means, whereby said electrically operable control mechanism is restarted and said motor is stopped by the respective electric switch means under control of said sequentially operable controlled devices at the proper times.

5. A control system according to claim 4, wherein said sequentially operable controlled devices have cams secured to a common shaft rotated by said motor and wherein said switch means are mounted at said devices to be engaged by the respective cams.

6. A control system according to claim 4, wherein said means to stop said electrically operable control mechanism is a normally closed limit switch inserted in the control circuit of said mechanism, said limit switch being operatively connected with said current regulating means in such a manner that said limit switch is opened and its control circuit interrupted when said current regulating means arrives at its low current value regulating position.

7. A control system according to claim 4, wherein said means to start said motor is a normally open limit switch inserted in the control circuit of said motor, said latter limit switch being operatively connected with said current regulating means in such a manner that said latter limit switch is closed and its control circuit completed when said current regulating means arrives at its low current value regulating position.

8. A control system according to claim 4, wherein a normally closed limit switch is inserted in the control circuit of said mechanism, said latter limit switch being operatively connected with said current regulating means in such a manner that said latter limit switch is opened and its control circuit interrupted when said current regulating means arrives at its maximum current value regulating position.

JACOB J. JAEGER.

REFERENCES CITED

The following references are of record in the file of this patent:

UNITED STATES PATENTS

| Number | Name | Date |
|---|---|---|
| 855,158 | Bliss | May 28, 1907 |
| 1,281,084 | Shaw et al. | Oct. 8, 1918 |
| 2,229,104 | Littwin | Jan. 21, 1941 |